United States Patent [19]
Walch

[11] Patent Number: 6,055,800
[45] Date of Patent: May 2, 2000

[54] AGRICULTURAL CUTTING MACHINE COMPRISING AN IMPROVED SUSPENSION DEVICE FOR THE CUTTING MECHANISM

[75] Inventor: Martin Walch, Dettwiller, France

[73] Assignee: Kuhn S.A., Saverne, France

[21] Appl. No.: 09/020,225

[22] Filed: Feb. 6, 1998

[30] Foreign Application Priority Data

Feb. 14, 1997 [FR] France ................................ 97 01922

[51] Int. Cl.[7] .......................... A01D 43/10; A01D 34/66
[52] U.S. Cl. ............................ 56/16.7; 56/6; 56/DIG. 17
[58] Field of Search .......................... 56/6, 7, 15.1, 15.7, 56/12.6, 16.7, DIG. 14, DIG. 17, 8, 228; 280/415.1; 172/240, 245

[56] References Cited

U.S. PATENT DOCUMENTS

| | | |
|---|---|---|
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora . |
| 4,811,553 | 3/1989 | Ermacora et al. . |
| 4,833,868 | 5/1989 | Ermacora et al. . |
| 4,848,069 | 7/1989 | Ermacora et al. . |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |
| 5,660,032 | 8/1997 | Neuerburg et al. . |

FOREIGN PATENT DOCUMENTS

| | | |
|---|---|---|
| 0 429 383 A1 | 5/1991 | European Pat. Off. . |
| 0 619 063 A1 | 10/1994 | European Pat. Off. . |
| 0 634 092 A1 | 1/1995 | European Pat. Off. . |
| 2 434 554 | 3/1980 | France . |
| 2 614 755 | 11/1988 | France . |
| 43 13 631 A1 | 10/1992 | Germany . |
| 94 13 007 | 11/1994 | Germany . |
| 2 007 955 | 5/1979 | United Kingdom . |
| 1 583 983 | 2/1981 | United Kingdom . |

*Primary Examiner*—Robert E. Pezzuto
*Attorney, Agent, or Firm*—Oblon, Spivak, McClelland, Maier & Neustadt, P.C.

[57] ABSTRACT

The invention relates to an agricultural cutting machine includes a chassis, a harvesting mechanism and a suspension device connecting the harvesting mechanism to the chassis. The suspension device includes a lower suspension member and an upper suspension member forming an articulated quadrilateral which allows the harvesting mechanism to move relative to the chassis. The geometric axis of the articulation connecting the lower suspension member to the harvesting mechanism passes through or substantially through the center of mass of the harvesting mechanism.

30 Claims, 5 Drawing Sheets

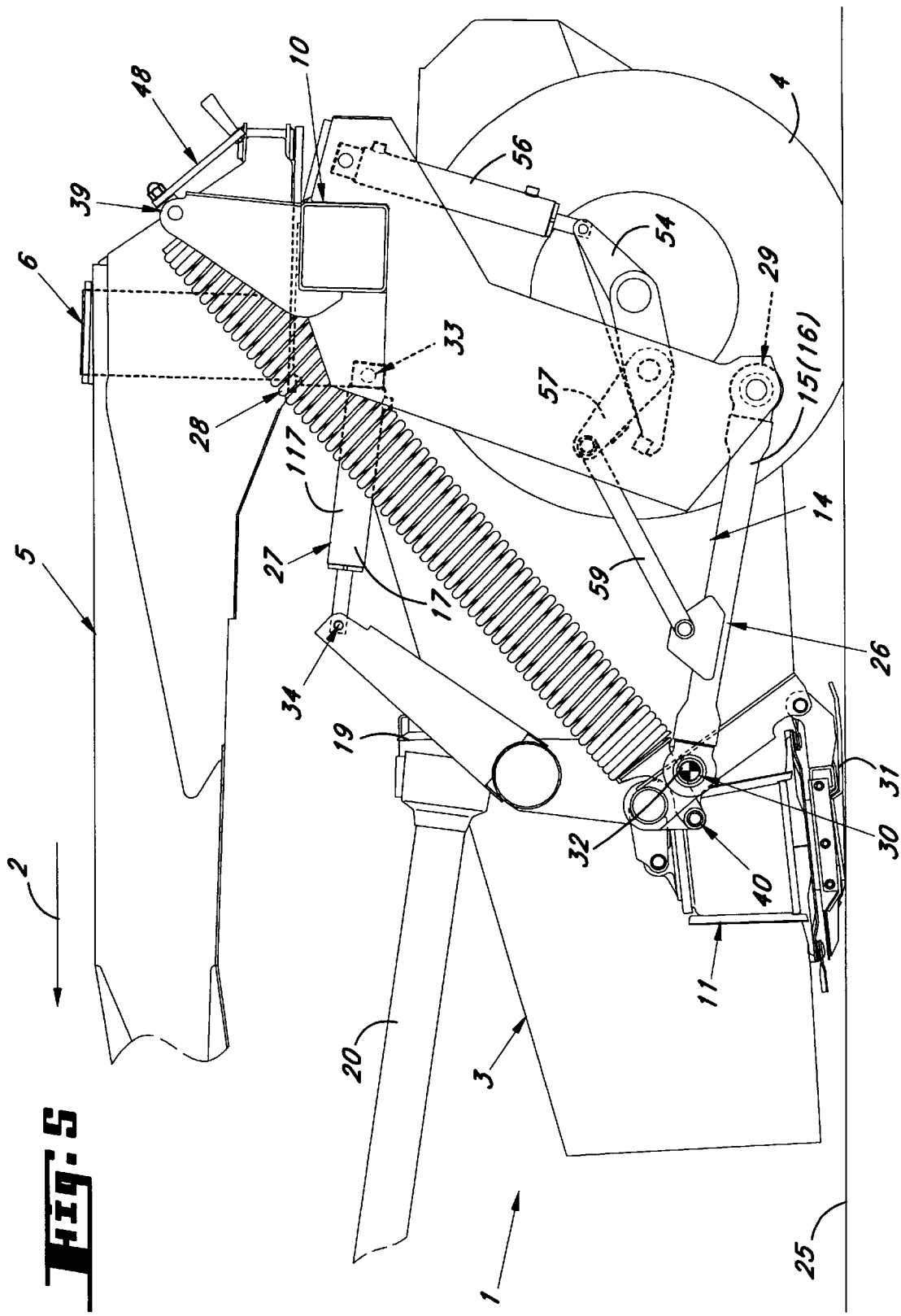

AGRICULTURAL CUTTING MACHINE COMPRISING AN IMPROVED SUSPENSION DEVICE FOR THE CUTTING MECHANISM

BACKGROUND OF THE INVENTION

1. Field of the Invention

The present invention relates to an agricultural cutting machine intended to be moved in a direction of work and comprising:

- a chassis,
- a harvesting mechanism intended to rest on the ground during work and equipped with cutting members, the harvesting mechanism having a center of mass,
- a suspension device connecting the said harvesting mechanism to the chassis and comprising a lower suspension member and an upper suspension member forming an articulated quadrilateral which allows the harvesting mechanism to move relative to the chassis, the lower suspension member and the upper suspension member each being connected to the chassis by means of a first respective articulation and to the harvesting mechanism by means of a second respective articulation, the first articulations and the second articulations each having a geometric axis which is substantially horizontal and transverse to the direction of work.

2. Discussion of the Background

An agricultural cutting machine of this kind is described in document U.S. Pat. No. 4,473,993. This machine comprises:

- a chassis running along the ground,
- a harvesting mechanism equipped with a cutter bar which has cutting sections, with a reel and with a windrowing screw, and
- a suspension device connecting the harvesting mechanism to the chassis and comprising two lower suspension links and an upper suspension link forming an articulated quadrilateral which allows the harvesting mechanism to move relative to the chassis.

The two lower suspension links are each connected to the chassis by means of a first respective articulation and to the harvesting mechanism by means of a second respective articulation. Furthermore, they each extend close to a respective longitudinal end of the harvesting mechanism.

The upper suspension link is also connected to the chassis by means of a first articulation and to the harvesting mechanism by means of a second articulation. This upper suspension link extends, when viewed from above, in the central part of the chassis and of the harvesting mechanism. Moreover, it is produced in the form of a hydraulic ram so that the cutting angle of the cutter bar can be adjusted.

This hydraulic ram is a single-acting ram. For this purpose, the second articulations of the two lower suspension links are arranged in such a way that an increase in cutting angle is brought about by the weight of the harvesting mechanism, while a decrease in the cutting angle is achieved using the ram.

For the weight of the harvesting mechanism actually to be capable of bringing about the correct increase in cutting angle, the center of mass of the harvesting mechanism needs to lie an appropriate distance forward of the second articulations of the two lower suspension links.

This means, particularly during transport, that the upper suspension link transmits not insignificant forces to the chassis, which forces may cause mechanical failures. In seeking to strengthen the various components to make them capable of withstanding these forces, there is a risk that the weight of the machine will be substantially increased.

During work, this layout may lead to a lack of stability of the cutting mechanism which is also detrimental to the good mechanical robustness of the various components and may have a harmful influence on the quality of work done. This phenomenon is felt all the more as the forward speeds increase.

SUMMARY OF THE INVENTION

The object of the present invention consists in solving this problem.

To this end, the agricultural cutting machine according to the invention is characterized in that the geometric axis of the second articulation of the lower suspension member passes through or substantially through the center of mass of the harvesting mechanism.

During transport, the upper suspension member is therefore practically unstressed.

During work, the harvesting mechanism has remarkable stability, even at high forward speeds.

The invention also relates to the following features taken in isolation or in any technically possible combination.

In an agricultural cutting machine like that of the invention, it may be advantageous to be able to adjust the cutting angle of the cutting members to suit the working conditions encountered. This makes it possible to obtain optimum working quality and to adapt the cutting height of the cutting members to the type of terrain in which the cutting machine is being operated. In some cases, cutting too close to the ground causes excessive wear on the cutting members and contaminates the cut product with earth.

For this, provision may therefore be made for the upper suspension member and(or) the chassis and(or) the harvesting mechanism to comprise a means allowing the cutting angle of the cutting members to be adjusted. Provision may thus be made for the upper suspension member to be of variable length and(or) for the first articulation of the upper suspension member to be sited in various envisaged positions on the chassis and(or) for the second articulation of the upper suspension member to be able to be sited in various envisaged positions on the harvesting mechanism. In a preferred embodiment, the upper suspension member may quite simply be formed of a mechanical ram or of a hydraulic ram.

Given that in an agricultural cutting machine of this kind the geometric axis of the second articulation of the lower suspension member passes through or substantially through the center of mass of the harvesting mechanism, the cutting angle will be able to be adjusted effortlessly and without it being necessary to provide a suitable tool for carrying out this operation.

In the agricultural cutting machine according to the invention, provision may also be made for the second articulation of the lower suspension member to extend above, preferably vertically above or substantially vertically above, the region in which the harvesting mechanism contacts the ground. When adjusting the cutting angle of the cutting members, the heightwise movement of the second articulation of the lower suspension member relative to the ground may thus be small or even zero.

In an advantageous embodiment of an agricultural cutting machine according to the invention, provision may be made:

- for the lower suspension member to comprise two lower suspension links each one extending near a respective longitudinal end of the harvesting mechanism, and for the upper suspension member to consist of an upper suspension link.

What is more, provision may advantageously be made for the upper suspension link to extend near to one of the longitudinal ends of the harvesting mechanism.

This arrangement will be very advantageous when the agricultural cutting machine comprises a drawbar intended to be connected, at its front end, to a tractor vehicle, and articulated at its rear end to the chassis by means of an articulation extending substantially in the vertical mid-plane of the chassis.

This arrangement will also be very advantageous when the upper suspension link needs to be used for adjusting the cutting angle of the cutting members, because it is then readily accessible to the user.

Provision may furthermore be made for the lower suspension member to be longer than the upper suspension member.

In a very advantageous embodiment, the lower suspension member and the upper suspension member form an articulated quadrilateral and converge to a point of convergence situated forward of the harvesting mechanism and above the ground.

A suspension quadrilateral of this kind allows the harvesting mechanism closely to follow the relief of the ground. The rubbing between the harvesting mechanism and the ground furthermore plays a part in lightening the harvesting mechanism.

In agricultural cutting machines according to the invention, it may actually be very advantageous for the harvesting mechanism to be lightened. The amount of lightening is, in some cases, of key importance to the quality of cutting and depends on the working conditions (nature of the terrain, nature of the product to be harvested, etc.).

Excessive lightening will not allow the harvesting mechanism to remain in constant contact with the ground. This will result in unacceptable uneven cutting.

Insufficient lightening on the other hand increases the risk of clogging and, depending on the type of cutting members, of dragging uncut product following a build-up of earth on the front edge of the cutting members, increases the power that has to be developed in order to pull the agricultural cutting machine along during work, increases wear, reduces the quality of the harvested product, and finally is harmful to the carpet of plants.

For this reason, provision may be made for the agricultural cutting machine also to comprise a device for lightening the harvesting mechanism transferring some of the weight of the harvesting mechanism onto the chassis. This lightening device may act between the lower suspension member and the chassis or between the harvesting mechanism and the chassis.

Furthermore, it will be very advantageous to connect the lightening device to the lower suspension member or to the harvesting mechanism at the geometric axis of the second articulation of the lower suspension member or near to the geometric axis. Thus, in instances where the lightening device is connected to the harvesting mechanism, the amount of lightening afforded by the lightening device will be unchanged, or at least will change very little, when provision is made for it to be possible for the cutting angle of the cutting members to be adjusted.

However, this also means that the line of action of the lightening device will pass through the geometric axis of the second articulation of the lower suspension member or very near to the geometric axis which itself passes through or substantially through the center of mass of the harvesting mechanism.

This lightening device may also advantageously comprise a mechanism for adjusting the amount of lightening.

It may furthermore comprise at least one member which is elastically deformable along its longitudinal axis.

This longitudinal axis of the elastically deformable member(s) will advantageously, in the normal work position of the harvesting mechanism, make an angle of between 25° and 55° with respect to a horizontal plane. With an arrangement of this kind, the amount of lightening afforded by the elastically deformable member(s) will not vary appreciably in the envisaged range of travel of the harvesting mechanism during work.

In an advantageous embodiment, provision may be made for each lightening device to comprise at least one elastically deformable member at each longitudinal end of the harvesting mechanism.

Provision may also be made for the elastically deformable member(s) (each) to consist of at least one mechanical tension spring.

Furthermore, provision may be made for the elastically deformable member(s) (each) to consist of two mechanical tension springs extending one inside the other. This gives an elastically deformable member which is compact but nonetheless capable of developing a great deal of force and which has a relatively flat deformation curve.

In instances where an elastically deformable member consists of a number of mechanical tension springs, the mechanism for adjusting the lightening will advantageously comprise one member for adjusting the lightening which is common to all of these springs.

The invention relates quite specifically, but non-limitingly, to agricultural cutting machines in which the chassis rests on the ground by means of wheels each of which are articulated to the chassis by means of a respective wheel arm. In these agricultural cutting machines, a hydraulic ram is generally provided, sited between each wheel arm and the chassis for raising the chassis particularly for the purpose of transport. In this case, provision may also advantageously be made for the hydraulic rams to act directly or indirectly on the lower suspension member.

As mentioned, the invention relates to agricultural cutting machines in general. However, it is quite specifically targeted at mowers, with or without members for treating the cut product, capable of working at high forward speeds, such as rotary mowers.

BRIEF DESCRIPTION OF THE DRAWINGS

In describing the preferred embodiment of the present invention illustrated in the drawings, specified terminology is employed for the sake of clarity. However, the invention is not intended to be limited to the specific terminology so selected, and it is to be understood that each specific element includes all technical equivalents which operate for a similar purpose.

A more complete appreciation of the invention and many of the attendant advantages thereof will be readily obtained as the same becomes better understood by reference to the following detailed description when considered in connection with the accompanying drawings, wherein:

FIG. 5 shows another embodiment of the upper suspension link.

DESCRIPTION OF THE PREFERRED EMBODIMENT

Figure 1:
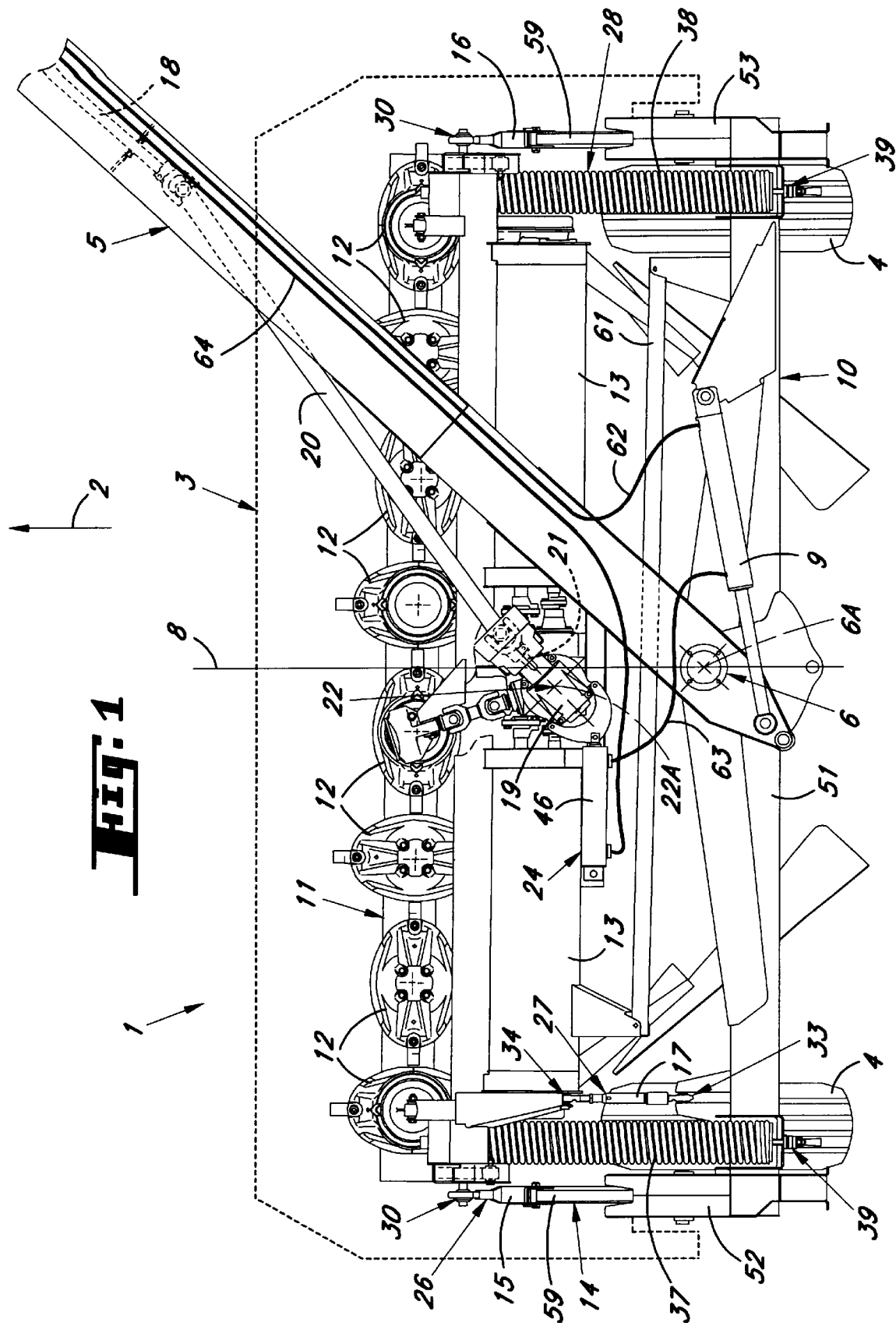
FIG. 1 shows a partial view from above of an agricultural cutting machine according to the invention in a work position.
Figure 2:
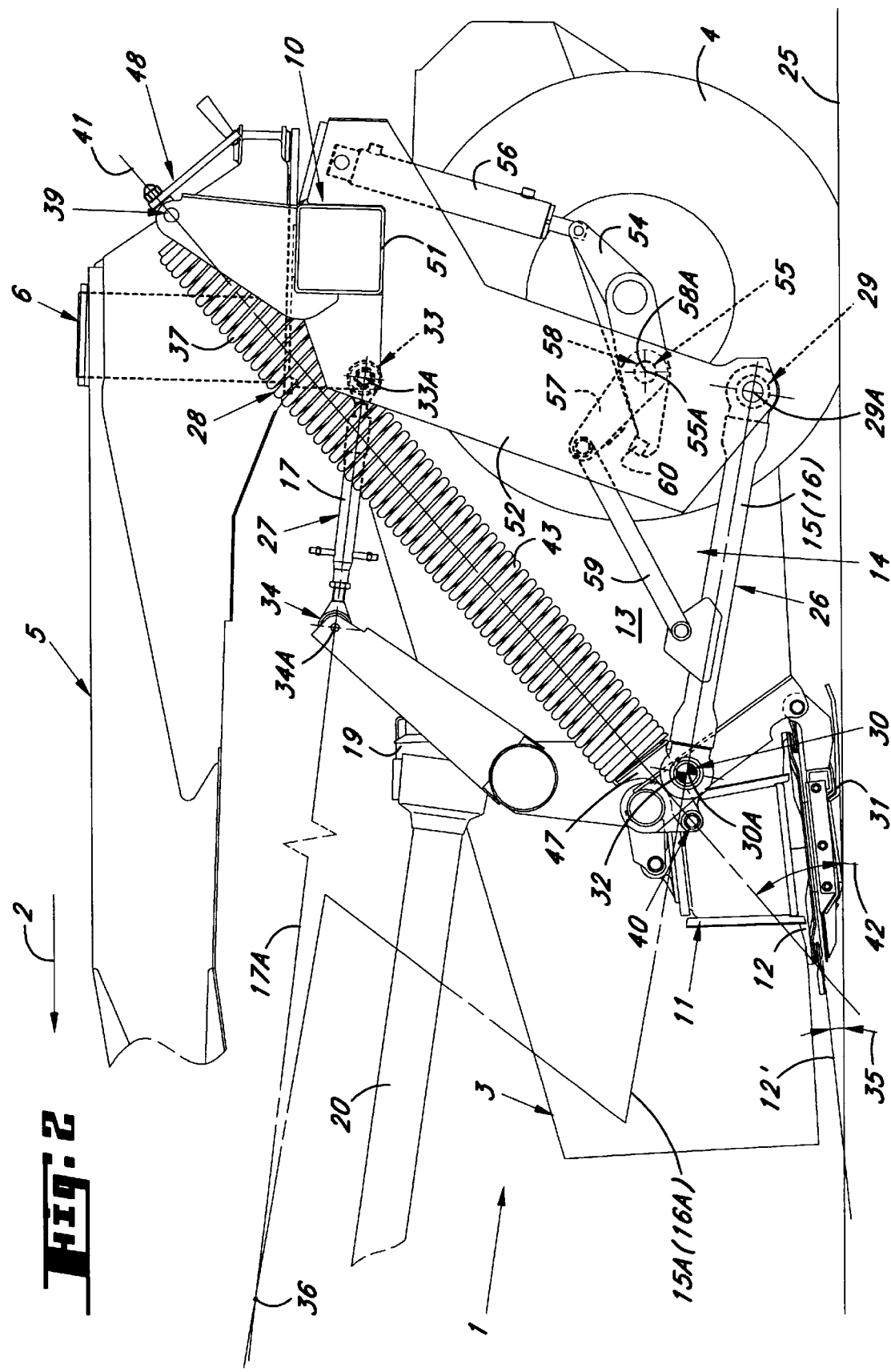
FIG. 2 shows a side view of the said agricultural cutting machine, the harvesting machine and the chassis being in the normal work position.
Figure 3:
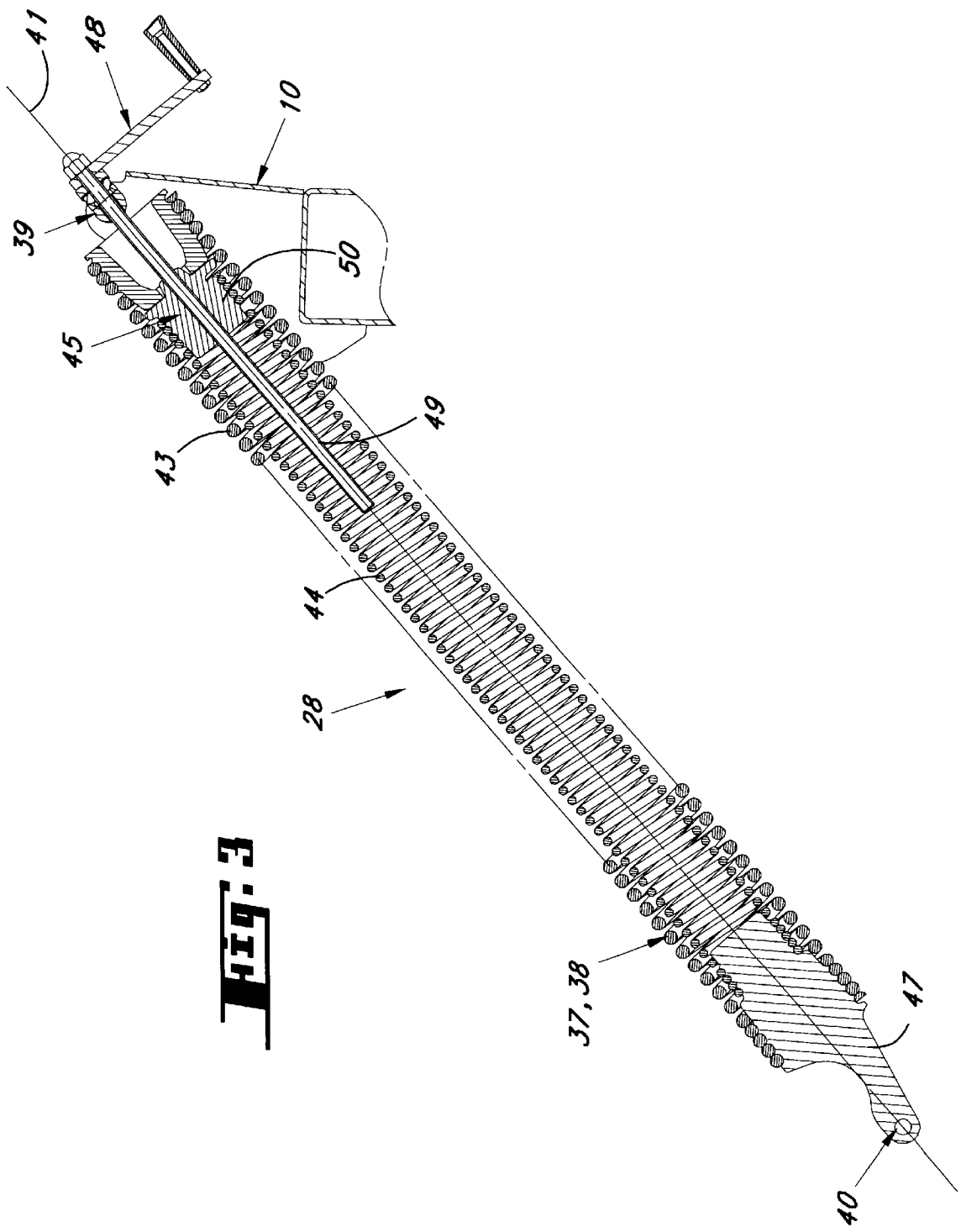
FIG. 3 shows a cross section of an elastically deformable member of the device for lightening the harvesting mechanism.
Figure 4:
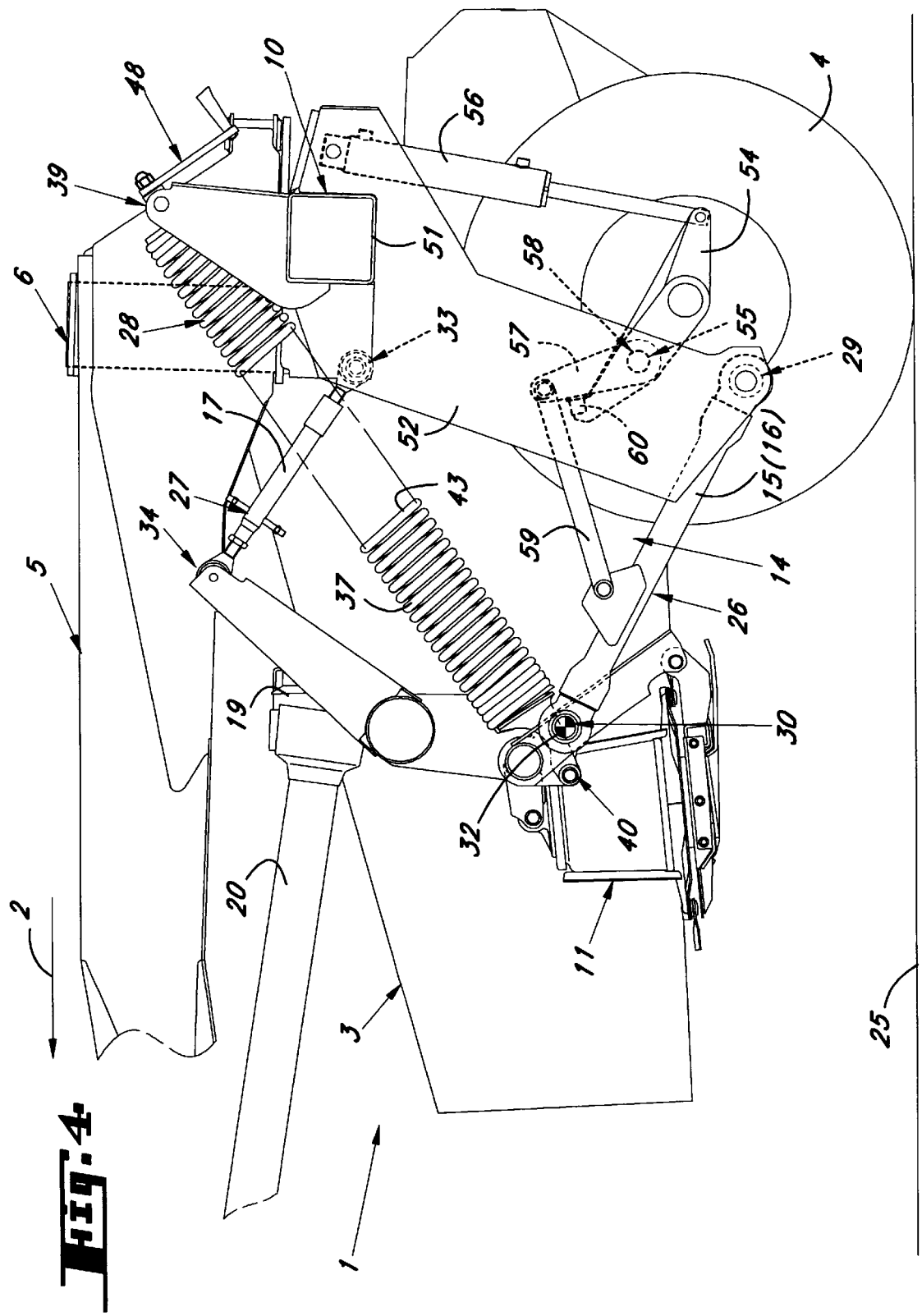
FIG. 4 is a view similar to that of FIG. 2, the harvesting mechanism and the chassis however being held away from the ground.

FIGS. 1 to 5 show an agricultural cutting machine according to the invention, produced in the form of a rotary mower-conditioner 1. The latter is hitched to a tractor vehicle, not depicted, which, during use, pulls it along in the sense and direction of travel 2.

In the remainder of the description, the following notations "front", "rear", "forward of" and "behind" are defined with respect to this direction of travel 2 and the notations "right" and "left" are defined when looking at the mower-conditioner 1 from the rear in the direction of travel 2.

This mower-conditioner 1 is made up of a body 3 running along the ground 25 by means of two wheels 4, and of a drawbar 5 intended to be connected, at its front end, to the tractor vehicle in a way known to those skilled in the art. The said drawbar 5 is also connected at its rear end to the body 3 by means of an articulation 6 of upwards-pointing geometric axis 6A (in the example depicted, this geometric axis 6A is substantially vertical and extends substantially in the vertical mid-plane 8 of the body 3, pointing in the direction of travel 2). The angular position of the drawbar 5 relative to the body 3 can be altered by pivoting the drawbar 5 about the geometric axis 6A of the articulation 6. This desired angular position is gained and maintained by a hydraulic operating ram 9 articulated between the drawbar 5 and the body 3. Thanks to this arrangement, the body 3 of the mower-conditioner 1 can, particularly during work, extend to the left or to the right of the tractor vehicle. This allows there-and-back mowing.

The body 3 of the mower-conditioner 1 first of all comprises a chassis 10 which rests on the ground 25 by means of two wheels 4 each of which extends close to a respective longitudinal end of the chassis 10. The body 3 of the mower-conditioner 1 also comprises a harvesting mechanism 11 fitted with cutting members 12 (rotary discs in the example depicted, each rotating about an upwardly-pointing respective axis) and with members 13 for treating the product cut by the cutting members 12 (such treatment members 13 are known to a person skilled in the art). This harvesting mechanism 11 is connected to the chassis 10 by means of a suspension device 14 consisting of a lower suspension member 26 and of an upper suspension member 27 which form, with the chassis 10 and the harvesting mechanism 11, an articulated quadrilateral which allows the harvesting mechanism 11 to move, essentially upwards and downwards, relative to the chassis 10 so as to adapt to the relief of the ground 25 independently of the said chassis 10.

The harvesting mechanism 11 is driven, for example, off the tractor vehicle power take-off in a way which is known to a person skilled in the art. Motion thus comes in via a shaft 18 supported by the drawbar 5 and is transmitted to a transmission box 19 by a telescopic transmission shaft 20 with universal joints fitted between the shaft 18 and the input shaft 21 of the transmission box 19. The latter is connected to the harvesting mechanism 11 and imparts the movement to members for driving the cutting members 12 and the treatment members 13, these members not being depicted in detail but being described in patent application FR 96/09351.

The transmission box 19 is connected to the harvesting mechanism 11 by means of an articulation 22 of upwards-pointing geometric axis 22A (in the example depicted, this axis 22A is substantially parallel to the axis 6A and extends forward of this axis 6A; it also extends slightly to the left of the vertical mid-plane 8). Thanks to this articulation 22, the input shaft 21 of the transmission box 19 always points towards the front end of the drawbar 5 irrespective of the angular position occupied by the latter. The transmission box 19 is placed and maintained in the appropriate angular position by a control means 24 in accordance with those which are the subject of patent application FR 96/04548: the hydraulic operating ram 9 acts as the first control ram fitted between the drawbar 5 and the body 3, and the second control ram 46 is fitted between the body 3 and the transmission box 19 and is connected in series with the hydraulic operating ram 9. These two hydraulic rams 9,46 are double-acting rams.

The mower-conditioner 1 also comprises a device 28 for lightening the harvesting mechanism 11, intended to transfer some of the weight of the harvesting mechanism 11 onto the chassis 10.

The lower suspension member 26 comprises two lower suspension links 15,16 each extending close to one respective longitudinal end of the harvesting mechanism 11. Each lower suspension link 15,16 is connected to the chassis 10 by means of a first respective articulation 29 and to the harvesting mechanism 11 by means of a second respective articulation 30. Furthermore, the first articulations 29 extend, especially in the normal work position, advantageously closer to the ground 25 than the second articulations 30. Thus, each lower suspension link 15,16 is, when viewed from the side, inclined forwards and upwards.

Moreover, the second articulations 30 of the lower suspension links 15,16 extend vertically above shoes 31 by means of which the harvesting mechanism 11 slides over the ground 25.

The first articulations 29 and the second articulations 30 of the two lower suspension links 15,16 also each have a respective geometric axis 29A,30A which is substantially horizontal and transverse to the direction of travel 2 (in the example depicted, the geometric axes 29A,30A extend substantially perpendicularly to the direction of travel 2). The geometric axes 29A of the first articulations 29 are substantially coincidental. The same is true of the geometric axes 30A of the second articulations 30. Furthermore, the geometric axes 30A of the second articulations 30 of the two lower suspension links 15,16 pass, according to the invention, substantially through the center of mass 32 of the harvesting mechanism 11.

As regards the upper suspension member 27, the latter consists of an upper suspension link 17 also extending close to one of the longitudinal ends of the harvesting mechanism 11 (in the example depicted, this is the left-hand longitudinal end of the harvesting mechanism 11 and of the chassis 10). The upper suspension link 17 is connected to the chassis 10 by means of a first articulation 33 and to the harvesting mechanism 11 by means of a second articulation 34. Furthermore, in this embodiment, the first articulation 33 extends, particularly in the normal work position, also lower down than the second articulation 34. Thus, the upper suspension link 17 is also, when viewed from the side, inclined forwards and upwards. Moreover, this first articulation 33 and this second articulation 34 each have a respective geometric axis 33A,34A which is substantially horizontal and transverse to the direction of travel 2. In fact, these geometric axes 33A,34A are substantially parallel to the geometric axes 29A,30A of the first articulations 29 and of the second articulations 30 of the two lower suspension links 15,16.

This upper suspension link 17 is, in the embodiment depicted, formed of a mechanical ram which means that its length can be varied for the purpose of adjusting the cutting angle 35 of the cutting members 12. This cutting angle 35 is the angle formed by the plane 12' in which the cutting members 12 move, with respect to the horizontal ground 25. In FIG. 5, the upper suspension link 17 is formed by a hydraulic ram 117.

It will further be noted that, thanks to the fact that the second articulations 30 of the two lower suspension links 15,16 are sited vertically above the shoes 31 and thanks to the shape of the latter, the height of the second articulations 30 varies only very little relative to the ground 25 when the cutting angle 35 is adjusted.

As can be seen in FIGS. 2 to 5, the lower suspension links 15,16 are longer than the upper suspension link 17. Moreover, the respective longitudinal axis 15A,16A of the lower suspension links 15,16 and the longitudinal axis 17A of the upper suspension link 17 converge a point of convergence 36 situated forward of the harvesting mechanism 11 and above the ground 25 (the respective longitudinal axis 15A,16A of the two lower suspension links 15,16 is the one that passes through the geometric axes 29A,30A of the first articulations 29 and of the second articulations 30 of the said lower suspension links 15,16, while the longitudinal axis 17A of the upper suspension link 17 is the one that passes through the geometric axis 33A,34A of the first articulation 33 and of the second articulation 34 of the said upper suspension link 17).

The device 28 for lightening the harvesting mechanism 11 comprises two elastically deformable members 37,38, each extending close to a respective longitudinal end of the harvesting mechanism 11. Each elastically deformable member 37,38 is connected to the chassis 10 by means of a first connection 39 and to the harvesting mechanism 11 by means of a second connection 40. This second connection 40 extends near to the geometric axis 30A of the second articulation 30 which connects the corresponding lower suspension link 15,16 to the harvesting mechanism 11, so that the longitudinal axis 41 of the elastically deformable member 37,38 practically intersects the geometric axis 30A of the second articulation 30, which geometric axis 30A passes substantially through the center of mass 32 of the harvesting mechanism 11 (in the example depicted, the longitudinal axis 41 passes slightly above the geometric axis 30A). The first connection 39, for its part, is sited on the chassis 10 in such a way that the longitudinal axis 41 of the elastically deformable member 37,38 makes, when the harvesting mechanism 11 is in the normal position of work, an angle 42 of about 40° with the horizontal ground 25.

Each elastically deformable member 37,38 consists of two mechanical tension springs 43,44: an outer spring 43 and an inner spring 44 which extends inside the outer spring 43. Each outer spring 43 and its respective inner spring 44 are connected, at their longitudinal end close to the chassis 10, to a first common connecting piece 45 and, at their longitudinal end close to the harvesting mechanism 11, to a second common connecting piece 47. This first common connecting piece 45 is connected to the chassis 10 by means of the first connection 39 and the second common connecting piece 47 is connected to the harvesting mechanism 11 by means of the second connection 40. The first common connecting piece 45 additionally comprises a common member 48 for adjusting the tension of the springs 43,44, that is to say for lightening the harvesting mechanism 11. In the example depicted, this common member 48 for adjusting the lightening consists of a screw 49 which is connected to the chassis 10 by the first connection 39 and which is screwed into a nut 50 of the first common connecting piece 45. It is to this nut 50 that the springs 43,44 are attached.

The chassis 10 consists of a beam 51 which is substantially horizontal and transverse to the direction of travel 2, and of a leg 52,53 extending downwards at each longitudinal end of the beam 51 towards the ground 25.

Each lower suspension link 15,16 is connected to the lower end of the respective leg 52,53 by means of the corresponding first articulation 29.

The upper suspension link 17, for its part, is connected to the beam 51 by means of its first articulation 33.

Near the lower end of each leg 52,53 there is also connected a wheel arm 54 which supports the corresponding wheel 4. Each wheel arm 54 is connected to the corresponding leg 52,53 by means of an articulation 55 of geometric axis 55A which is substantially horizontal and transverse to the direction of travel 2 (in the example depicted, the geometric axis 55A is substantially perpendicular to the direction of travel 2). The geometric axes 55A of the articulations 55 of the two wheel arms 54 are substantially coincidental. Furthermore, each articulation 55 extends substantially vertically above the first articulation 29 connecting the lower suspension link 15,16 to the corresponding leg 52,53.

Also provided between each wheel arm 54 and the chassis 10 is a hydraulic ram 56 which allows the wheel arm 54 and the corresponding wheel 4 to be pivoted with respect to the chassis 10 about the geometric axis 55A of the corresponding articulation 55. This makes it possible for the chassis 10 to be brought closer to the ground 25 during the cutting phase and be held away from the ground 25 when cutting is interrupted.

A first arm 57 is also connected to each leg 52,53 of the chassis 10 by means of an articulation 58 the geometric axis 58A of which here is substantially coincidence with the geometric axis 55A of the articulation 55 connecting the corresponding wheel arm 54 to the leg 52,53. A second arm 59 is, furthermore, articulated between the first arm 57 and the corresponding lower suspension link 15,16. The corresponding wheel arm 54, for its part, is extended forwards beyond the articulation 55 connecting it to the leg 52,53. At its front end, the wheel arm 54 has a rest 60 extending transversely to the direction of travel 2 as far as under the corresponding first arm 57. This rest 60 is intended to come into contact with the said first arm 57 when the chassis 10 needs to be moved away from the ground 25. In the normal work position there is, however, a certain clearance between the rest 60 and the corresponding first arm 57.

The mower-conditioner 1 just described, works as follows.

During work, the chassis 10 is lowered. The harvesting mechanism 11 rests on the ground 25 by means of the shoes 31. The tractor vehicle (not depicted) to which the mower-conditioner 1 is connected, pulls it along in the direction of travel 2 and drives the cutting members 12 and the treatment members 13. As the device moves along, the cutting members 12 cut the product to be cut. The latter is transferred to the treatment members 13 which subject it to the anticipated treatment and then deposit it on the ground 25 behind the machine.

Thanks to the suspension device 14, the harvesting mechanism 11 can follow unevennesses of the ground 25. The harvesting mechanism 11 can first of all move upwards and downwards relative to the chassis 10 by deformation of the articulated quadrilateral formed by the two lower suspension links 15,16 and the upper suspension link 17 with the chassis 10 and the harvesting mechanism 11. It should be recalled that in the normal work position, the rest 60 of each wheel arm 54 is somewhat away from the first arm 57 precisely to allow the harvesting mechanism 11 to move downwards relative to the chassis 10. However, the harvesting mechanism 11 can also pivot somewhat about an axis parallel to the direction of travel 2. The first articulations 29,33 and the second articulations 30,34 of the two lower suspension links 15,16 and of the upper suspension link 17 actually allow such a rotation. In the embodiment depicted, these articulations 29,30,33,34 are of the ball-joint type, a transverse bar 61 articulated between the chassis 10 and the harvesting mechanism 11 preventing the harvesting mechanism 11 from moving transversely to the direction of travel 2 during work.

The lightening device 28 transfers much of the weight of the harvesting mechanism 11 onto the chassis 10. The amount of lightening provided can be adjusted using the adjusting mechanism which consists of the two common members 48 for adjusting the tension in the springs 43,44. Bearing in mind the arrangement of the springs 43,44, the amount of lightening afforded thereby remains relatively constant within the range of travel of the harvesting mechanism 11 during work for following unevennesses of the ground 25.

Furthermore, the harvesting mechanism 11 is also subject to dynamic lightening which is added to the lightening afforded by the springs 43,44. This is because during work, the resistance to forward motion created by the rubbing of the harvesting mechanism 11 on the ground 25, generates a lightening moment with respect to the point of convergence 36 of the lower suspension member 26 and upper suspension member 27.

To move the chassis 10 and the harvesting mechanism 11 away from the ground 25, the user supplies the hydraulic rams 56 with oil from the tractor vehicle. As he does this, each hydraulic ram 56 lengthens and pivots the rear part of the corresponding wheel arm 54 downwards relative to the chassis 10, the pivoting taking place about the geometric axis 55A of the articulation 55 connecting the wheel arm 54 to the chassis 10. As the corresponding wheel 4 is resting on the ground 25, it is the chassis 10 which is raised. In parallel, the front end of the wheel arm 54 pivots upwards relative to the chassis 10. When the rest 60 on the wheel arm 54 comes into contact with the corresponding first arm 57, the latter also pivots upwards relative to the chassis 10, the pivoting taking place about the geometric axis 58A of the articulation 58 connecting the first arm 57 to the chassis 10. In pivoting, the first arm 57 pulls on the corresponding second arm 59 which in turn makes the corresponding lower suspension link 15,16 pivot upwards relative to the chassis 10, this pivoting taking place about the geometric axis 29A of the first articulation 29 connecting the lower suspension link 15,16 to the chassis 10.

This then gives a substantial ground clearance for transporting the mower-conditioner 1.

In the set-up depicted in FIG. 1, the mower-conditioner 1 works to the left of the tractor vehicle. At the end of the field, the user, from the tractor vehicle, injects oil into a third hydraulic pipe 64 connected to the second control ram 46. This has the effect of lengthening this second control ram 46 and of shortening the operating ram 9, because oil contained in the said second control ram 46 is transferred into the operating ram 9 through a second hydraulic pipe 63 connecting these two hydraulic rams 9,46 together. Surplus oil in the operating ram 9 returns to the tractor vehicle through a first hydraulic pipe 62. While this is happening, the transmission box 19 and the drawbar 5 pivot into their second work position in which the mower-conditioner 1 will work to the right of the tractor vehicle.

It will be understood that to return from the work position to the right of the tractor vehicle, to the work position to the left of the tractor vehicle, the user, from the tractor vehicle, injects oil into the first hydraulic pipe 62. This will have the effect of lengthening the operating ram 9 and of shortening the second control ram 46, because oil contained in the said operating ram 9 is transferred into the second control ram 46 through the second hydraulic pipe 63. Surplus oil in the second control ram 46 returns to the tractor vehicle through the third hydraulic pipe 64. While this is happening, the transmission box 19 and the drawbar 5 return to the first position of work in which the mower-conditioner 1 will again work on the left-hand side of the tractor vehicle.

For transport, the drawbar 5 is placed substantially in the direction of travel 2.

During transport, the harvesting mechanism 11 is essentially supported by the two lower suspension links 15,16. The upper suspension link 17 is practically unstressed.

During work, the harvesting mechanism 11 is remarkably stable.

The cutting angle 35 is very easy to adjust and can be adjusted with minimum effort.

It has been possible for the upper suspension link 17 to be sited close to a longitudinal end of the harvesting mechanism 11 and of the chassis 10. It is therefore very readily accessible for making the adjustments to the cutting angle 35. Furthermore, this arrangement frees up the central part of the harvesting mechanism 11 and of the chassis 10 where the transmission box 19 and the drawbar 5 are already articulated.

The mower-conditioner 1 just described is merely one embodiment which must not in any way be taken as restricting the field of protection defined by the claims which follow.

What is claimed as new and desired to be secured by Letters Patent of the United States is:

1. An agricultural cutting machine intended to be moved in a direction of work and comprising:
    a chassis;
    a harvesting mechanism for resting on the ground during work and equipped with cutting members, said harvesting mechanism having a center of mass;
    a suspension device connecting the harvesting mechanism to the chassis and comprising a lower suspension member and an upper suspension member forming an articulated quadrilateral which allows the harvesting mechanism to move relative to the chassis, said lower suspension member and said upper suspension member each being connected to the chassis by a first respective articulation member and to the harvesting mechanism by a second respective articulation member, said first articulation member and said second articulation member each having a geometric axis which is substantially horizontal and transverse to the direction of work;
    wherein said geometric axis of the second articulation member of the lower suspension member passes substantially through the center of mass of the harvesting mechanism.

2. An agricultural cutting machine according to claim 1, wherein said agricultural cutting machine comprises an adjusting mechanism allowing a cutting angle of the cutting members to be adjustable.

3. An agricultural cutting machine according to claim 2, wherein the upper suspension member comprises a suspension member of variable length.

4. An agricultural cutting machine according to claim 1, wherein the second articulation member of the lower suspension member extends above the region in which the harvesting mechanism contacts the ground.

5. An agricultural cutting machine according to claim 4, wherein the second articulation member of the lower suspension member extends substantially vertically above the region in which the harvesting mechanism contacts the ground.

6. An agricultural cutting machine according to claim 1, wherein:
the lower suspension member comprises two lower suspension links each of which extends near a respective longitudinal end of the harvesting mechanism; and
the upper suspension member comprises an upper suspension link.

7. An agricultural cutting machine according to claim 6, wherein the upper suspension link extends near to one of the longitudinal ends of the harvesting mechanism.

8. An agricultural cutting machine according to claim 6, wherein:
the upper suspension member is of variable length; and
the upper suspension link comprises a ram.

9. An agricultural cutting machine according to claim 8, wherein the ram is a hydraulic ram.

10. An agricultural cutting machine according to claim 1, wherein the lower suspension member is longer than the upper suspension member.

11. An agricultural cutting machine according to claim 1, wherein the lower suspension member and the upper suspension member form an articulated quadrilateral and converge at a point of convergence situated forward of the harvesting mechanism and above the ground.

12. An agricultural cutting machine according to claim 1, which comprises a device for lightening the harvesting mechanism transferring some of the weight of the harvesting mechanism onto the chassis.

13. An agricultural cutting machine according to claim 12, wherein the lightening device acts between the lower suspension member and the chassis.

14. An agricultural cutting machine according to claim 13, wherein the lightening device is connected to the lower suspension member near to the geometric axis of the second articulation member of said lower suspension member.

15. An agricultural cutting machine according to claim 12, wherein the lightening device acts between the harvesting mechanism and the chassis.

16. An agricultural cutting machine according to claim 14, wherein the lightening device is connected to the harvesting mechanism near to the geometric axis of the second articulation member of the lower suspension member.

17. An agricultural cutting machine according to claim 12, wherein the lightening device comprises a mechanism for adjusting the amount of lightening.

18. An agricultural cutting machine according to claim 12, wherein the lightening device comprises at least one member which is elastically deformable along a longitudinal axis thereof.

19. An agricultural cutting machine according to claim 18, wherein the longitudinal axis of the at least one elastically deformable member forms, in a normal work position of the harvesting mechanism, an angle of between 25° and 55° with respect to a horizontal plane.

20. An agricultural cutting machine according to claim 17, wherein the lightening device comprises at least one elastically deformable member at each longitudinal end of the harvesting mechanism.

21. An agricultural cutting machine according to claim 20, wherein the at least one elastically deformable member comprises at least one mechanical tension spring.

22. An agricultural cutting machine according to claim 21, wherein the at least one elastically deformable member comprises two mechanical tension springs extending one inside the other.

23. An agricultural cutting machine according to claim 20, wherein:
the lightening device comprises a mechanism for adjusting the amount of lightening; and,
said mechanism for adjusting the lightening comprises a member for adjusting the lightening which is common to all the mechanical tension springs of one same elastically deformable member.

24. An agricultural cutting machine according to claim 1, wherein:
the chassis rests on the ground by wheels each of which are articulated to the chassis by a respective wheel arm; and
a hydraulic ram is situated between each wheel arm and the chassis in order to raise the chassis for the purpose of transport.

25. An agricultural cutting machine according to claim 24, wherein the hydraulic rams also act directly on the lower suspension member.

26. An agricultural cutting machine according to claim 1, wherein the cutting machine comprises a mower.

27. An agricultural cutting machine according to claim 26, wherein the cutting machine comprises a rotary mower.

28. An agricultural cutting machine according to claim 1, wherein the cutting machine comprises a mower with members for treating the cut product.

29. An agricultural cutting machine according to claim 28, wherein the cutting machine comprises a rotary mower.

30. An agricultural cutting machine according to claim 24, wherein the hydraulic rams act indirectly on the lower suspension member.

* * * * *